June 4, 1963  D. M. VESPER ETAL  3,092,765
CONTROL MECHANISM
Filed June 19, 1961  2 Sheets-Sheet 1

INVENTORS
DANIEL M. VESPER
MARK E. LARKIN
BY  Hudson & Young
ATTORNEYS

June 4, 1963 D. M. VESPER ETAL 3,092,765
CONTROL MECHANISM
Filed June 19, 1961 2 Sheets-Sheet 2
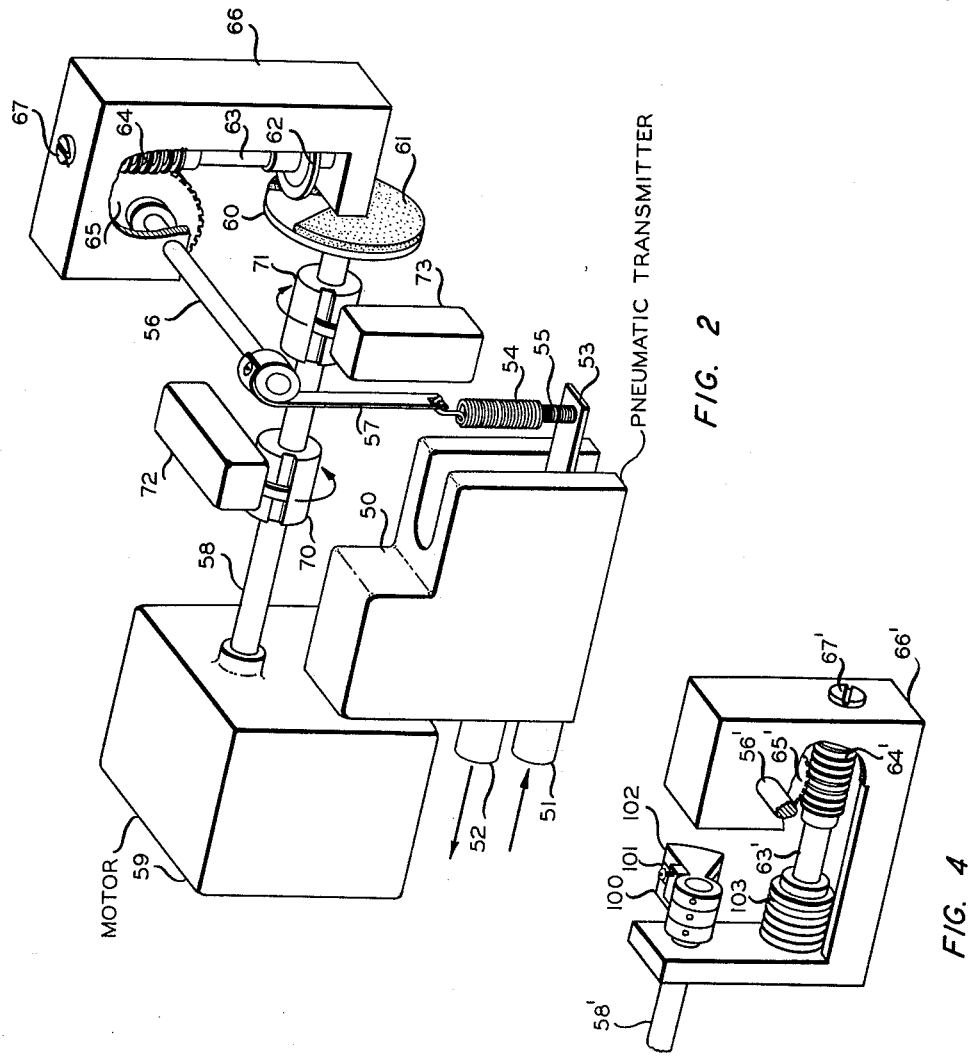
INVENTORS.
DANIEL M. VESPER
MARK E. LARKIN
BY Hudson & Young
ATTORNEYS

United States Patent Office 3,092,765
Patented June 4, 1963

3,092,765
CONTROL MECHANISM
Daniel M. Vesper, Bartlesville, Okla., and Mark E. Larkin, Independence, Kans., assignors to Phillips Petroleum Company, a corporation of Delaware
Filed June 19, 1961, Ser. No. 117,982
6 Claims. (Cl. 318—207)

This invention relates to apparatus for changing the set point of a controller in response to a signal exceeding preselected limits.

In the process control field, various systems are known for regulating process variables in response to changes of one or more measured conditions. Many of these control systems employ some type of limiting means to prevent fluctuations of the controlled variable outside a preselected range in order to avoid damage or unstable operations. However, these limiting means are not always desirable because the process may operate continuously at one end of the preselected range without ever reaching the desired operating conditions. One specific example of such a control system involves regulating the flow of external reflux to a fractionation column in response to a computation of the internal reflux within the column. In some fractionation systems, there may not be enough external reflux available to maintain the computed internal reflux constant at a preset value. If the external reflux flow is maintained constant at the maximum or minimum value available, the internal reflux still may vary to cause unstable operation.

In accordance with the present invention, apparatus is provided for changing the set point of a controller whenever a selected signal exceeds preselected limits. The apparatus of this invention comprises a reversible motor and means connected to the drive shaft thereof to adjust the set point of the controller. The motor operation is controlled by a pair of switches which are actuated selectively in response to a measured signal exceeding predetermined upper and lower limits. The direction of rotation of the motor is determined by the particular switch that is actuated. Means are provided to keep the motor actuated for a period of time sufficient to adjust the set point of the controller by a preselected amount whenever one of the switches is actuated. In this manner, the set point of the controller is adjusted periodically as required to keep the measured signal from exceeding the preselected range.

Accordingly, it is the primary object of this invention to provide apparatus for changing the set point of a controller in response to a signal exceeding preselected limits.

Other objects, advantages and features of the invention should become apparent from the following detailed description, taken in conjunction with the accompanying drawing in which:

FIGURE 1 is a schematic representation of a fractionation control system having the control mechanism of this invention incorporated therein.

FIGURE 2 is a schematic view of a first embodiment of the control mechanism of this invention.

FIGURE 3 is a schematic drawing of the electrical circuit which controls the operation of the motor of FIGURE 2.

FIGURE 4 is a schematic view illustrating a second embodiment of a portion of the control mechanism of this invention.

The controller reset mechanism of this invention will be described in conjunction with apparatus for controlling a fractionation system. Referring now to the drawing in detail and to FIGURE 1 in particular, there is shown a fractionation column 10. A feed mixture to be separated is introduced into an upper region of column 10 through a conduit 11. Heat is supplied to the lower region of column 10 by circulating steam or other heating medium through a reboiler 12. Vapors are removed from the top of column 10 through a conduit 13 which communicates with an accumulator 14 through a condenser 15. A portion of the condensate in accumulator 14 is returned to column 10 as external reflux through a conduit 16. The remainder of the condensate is removed as an overhead product through a conduit 17. The flow of overhead product is regulated by a liquid level controller 18 which adjusts a valve 19 to maintain a predetermined level in accumulator 14. A kettle product is withdrawn from the bottom of column 10 through a conduit 22. The flow through conduit 22 is regulated by a liquid level controller 23 which adjusts a valve 24 so as to maintain a predetermined liquid level in the lower region of column 10.

In order to explain the operation of the control system associated with the fractionation column of FIGURE 1, an equation which is representative of the internal reflux in a fractionation column will be derived. Internal reflux is defined herein as the external reflux returned to the column plus the vapor which is condensed near the top of the column by subcooled external reflux.

The material balance at the top tray of the fractionator can be expressed:

$$R_e + V_1 = R_i + V_0 \tag{1}$$

where
$R_e$ = mass flow of liquid entering top tray (external reflux)
$V_1$ = mass flow of vapor entering top tray
$R_i$ = mass flow of liquid leaving top tray (internal reflux)
$V_0$ = mass flow of vapor leaving top tray.

The heat balance at the top tray can be expressed.

$$R_e h_e + V_1 H = R_i h_i + V_0 H \tag{2}$$

where
$h_e$ = enthalpy of external reflux
$h_i$ = enthalpy of internal reflux
$H$ = enthalpy of vapor streams (assumed to be equal).

The enthalpy of the vapor streams entering and leaving the top tray can be expressed:

$$H = h_i + \lambda \tag{3}$$

where $\lambda$ is the heat of vaporization of liquid on the tray.
The enthalpy of the external reflux can be expressed:

$$h_e = h_i - C_p \Delta T \tag{4}$$

where
$C_p$ = specific heat of the external reflux stream
$\Delta T$ = the difference in temperature between the top tray and external reflux.

Equation 3 can be substituted into Equation 2 to eliminate H and rewritten:

$$V_1(h_i + \lambda) - V_0(h_i + \lambda) = R_i h_i - R_e h_e \tag{5}$$

Equation 4 can be substituted into Equation 5 to eliminate $h_e$ and rewritten:

$$(h_i + \lambda)(V_1 - V_0) = h_i(R_i - R_e) + R_e C_p \Delta T \tag{6}$$

From Equation 1 it is known:

$$V_1 - V_0 = R_i - R_e \tag{7}$$

Equation 7 can be substituted into Equation 6 and reduced to obtain:

$$R_i = R_e \left(1 + \frac{C_p}{\lambda} \Delta T\right) \tag{8}$$

Apparatus is provided in the control system of FIGURE 1 to establish a signal representative of the internal reflux $R_i$. A differential pressure transmitter 25 is connected across an orifice in conduit 16 to establish a signal which is representative of the differential pressure across the orifice. This signal is applied to the input of a means 26 for establishing an output signal representative of the square root of the input signal thereto. The output signal of means 26, which is thus proportional to the flow $R_e$ through conduit 16, is applied to the first input of a multiplying means 27. A first temperature sensing element 28 is disposed within the upper region of column 10. A second temperature sensing element 29 is disposed in conduit 16 adjacent column 10. Elements 28 and 29 are connected to the inputs of respective temperature transducers 30 and 31 which establish output signals representative of the respective measured temperatures. The outputs of transducers 30 and 31 are connected to the respective inputs of a differential temperature transducer 32 which establishes an output signal representative of the difference between the two temperatures sensed by elements 28 and 29. If it is assumed that the temperature of the vapor above the top tray is equal to the temperature of the liquid on the top tray, the term $\Delta T$ is thus established by transducer 32. Transducer 32 is actually calibrated to provide an output signal proportional to the term:

$$\left(1+\frac{C_p}{\lambda}\Delta T\right)$$

where $C_p/\lambda$ is assumed to be a constant for any given separation. This signal is applied to the second input of multiplying means 27. The output signal from multiplying means 27 is thus representative of the term $R_i$ of Equation 8.

An equation representative of the internal feed in a fractionation column will now be derived. Internal feed is defined herein as the liquid feed supplied to the column plus the vapor which is condensed near the feed tray by subcooled feed.

The material balance at the feed tray of the fractionator can be expressed:

$$L_2+F+V_3=R_{1f}+V_2 \qquad (9)$$

where
$L_2$=internal reflux entering feed tray
$F$=feed entering feed tray
$V_3$=mass flow of vapor entering feed tray
$R_{1f}$=total liquid leaving feed tray
$V_2$=mass flow of vapor leaving feed tray.

The heat balance at the feed tray can be expressed:

$$h_{L_2}L_2+h_FF+h_{V_3}V_3=h_{R_{1f}}R_{1f}+h_{V_2}V_2 \qquad (10)$$

where
$h_{L_2}$=enthalpy of liquid $L_2$
$h_F$=enthalpy of feed
$h_{V_3}$=enthalpy of vapor $V_3$
$h_{R_{1f}}$=enthalphy of liquid $R_{1f}$
$h_{V_2}$=enthalpy of vapor $V_2$.

If it is assumed that the liquid $R_{1f}$ leaving the feed tray and the vapor $V_2$ leaving the feed tray are at the same temperature, $$h_{V_2}=h_{R_{1f}}+\lambda' \qquad (11)$$

where $\lambda'$ is the heat of vaporization of liquid on the feed tray.

Also, $$h_F=h_{R_{1f}}-C_p'(T_T-T_F) \qquad (12)$$

where
$C_p'$=specific heat of the feed
$T_T$=temperature of liquid on the feed tray
$T_F$=temperature of the feed.

It is also assumed that $h_{L_2}=h_{R_{1f}}$ and $h_{V_3}=h_{V_2}$. These relationships and Equations 11 and 12 can be substituted into Equation 10 and rewritten:

$$h_{R_{1f}}L_2+Fh_{R_{1f}}-FC_p'(T_T-T_F)$$
$$+(h_{R_{1f}}+\lambda')(V_3-V_2)=h_{R_{1f}}R_{1f} \qquad (13)$$

From Equation 9 it is known:

$$(V_3-V_2)=R_{1f}-L_2-F \qquad (14)$$

Equation 14 can be substituted into Equation 13 and reduced to obtain:

$$R_{1f}=F\left[1+\frac{C_p'}{\lambda}(T_T-F_F)\right]+L_2 \qquad (15)$$

If the internal feed $F_i$ is defined as $(R_{1f}-L_2)$ and $\Delta T'$ is defined as $(T_T-T_F)$, Equation 15 becomes:

$$F_i=F\left(1+\frac{C_p'}{\lambda'}\Delta T'\right) \qquad (16)$$

A second differential pressure transducer 35 is connected across an orifice in feed conduit 11 to establish an output signal representative of the square of the flow through conduit 11. This signal is applied through a second square root means 36 to the first input of a second signal multiplying means 37. Temperature sensing elements 38 and 39 are disposed within column 10 adjacent the feed entry and in conduit 11 respectively. Elements 38 and 39 are connected to the inputs of respective temperature transducers 45 and 41. The outputs of transducers 45 and 41 are connected to the respective inputs of a differential temperature transducer 42. Transducer 42 is calibrated to provide an output signal representative of the term $$\left(1+\frac{C_p'}{\lambda'}\Delta T'\right)$$

of Equation 16. The output signal of transducer 42 is applied to the second input of multiplier 37. The output signal of multiplier 37 is thus representative of the term $F_i$ of Equation 16.

In the fractionation system thus far described, the feed stream is introduced into the column at an upper region of column 10 which is near the point of external reflux introduction. Accordingly, the total liquid moving downwardly through the column from this common upper region is equal to the sum of the internal reflux and the internal feed. The output signals of multipliers 27 and 37 of FIGURE 1 are thus applied to the respective inputs of a summing means 46. The output signal of summing means 46 is applied to a flow recorder-controller 47 which adjusts a valve 40 in reflux conduit 16. The flow of external reflux is thus regulated so as to keep the total liquid flow downwardly through the column constant at a preselected value As long as the amount of external reflux available in the system is at least equal to the maximum amount that may be necessary to maintain a constant liquid flow in the column, the control system of FIGURE 1 is adequate. However, in some operations it has been found that the available external reflux is not sufficient to keep the internal liquid flow through the column constant at any desired value. Under these circumstances, the reset mechanism of this invention is employed. The output signal from differential pressure transducer 25 is applied to the input of this reset mechanism 43. Reset mechanism 43 remains inoperative as long as the output signal from pressure tranducer 25 does not exceed preselected limits. However, any time this signal does exceed the preselected limits, reset mechanism 43 is adequate to adjust the set point of flow controller 47 in the manner described hereinafter in detail.

A first embodiment of reset mechanism 43 is illustrated schematically in FIGURE 2. This reset mechanism employs a conventional pneumatic transmitter 50. A pneumatic pressure of constant value is applied to the inlet port 51 of transmitter 50. An output pneumatic pressure is transmitted from a port 52 which is a function of the input pressure. The relationship between the output pressure and the input pressure is controlled by the position of a plate 53. This plate can adjust the position of a flapper adjacent a nozzle within the transmitter, as is well known by those familiar with the pneumatic control art, to control the output pressure at port 52. Plate 53 normally is retained in a downwardly position by means of a biasing spring, not shown, within transmitter 50. The first end of a spring 54 is attached to a screw 55 which is threaded to the end of plate 53. The second end of spring 54 is secured to a belt 57 which is attached at its upper end to a rotatable shaft 56. Rotation of shaft 56 in a clockwise direction thus increases the tension on spring 54 to lift the end of plate 53. Counterclockwise rotation of shaft 56 permits plate 53 to be lowered by the spring within transmitter 50.

Shaft 56 is connected to the drive shaft 58 of a reversible motor 59. A first solid disk 60 is mounted on the end of drive shaft 58. A second disk 61 having a cutout sector is secured to disk 60. A wheel 62 is mounted on a shaft 63 so as to be rotated when engaged by disk 61. Wheel 62 remains stationary when the open sector of disk 61 is adjacent the wheel. Shaft 63 carries a worm 64 which meshes with a gear 65 on shaft 56. Shaft 63 is mounted within a frame 66 in such a manner as to rotate freely. Wheel 62 is affixed to shaft 63 by means of a set screw, not shown. This is to provide a means for adjusting the vertical position of wheel 62 with respect to disk 61 so as to vary the degree of rotation of shaft 63 for each rotation of motor shaft 58. The screw driver slot 67 provides a means of adjusting the tension of spring 54 initially to preset the output of transmitter 50.

First and second clutches 70 and 71 are mounted on drive shaft 58 to actuate respective electrical switches 72 and 73. Clutch 70 is arranged so that the outer race thereof rotates in a counterclockwise direction when drive shaft 58 rotates in a counterclockwise direction. However, the outer race of clutch 70 remains stationary when drive shaft 58 rotates in a clockwise direction. Clutch 71 is of like construction except that the outer race rotates only when drive shaft 58 rotates in a clockwise direction. These clutches can be one-way roller clutches of the type described in Catalog B-54 of Miniclutch Company, Hamden, Conn., for example.

With reference to FIGURE 1, reset mechanism 43 is actuated by the output signal from differential pressure transducer 25. This pressure transducer establishes an output pneumatic pressure which is a direct function of the flow through conduit 16. The pressure from transducer 25 is applied by means of a conduit 75 to the interior of bellows 76 and 77, see FIGURE 3. The upper ends of bellows 76 and 77 engage respective fixed supports, whereas the lower movable ends of the bellows engage respective spring retainers 78 and 79. A spring 80 extends between retainer 78 and a second retainer 81 which is adjustably secured to a fixed support plate 82. In a similar manner, a spring 83 extends between retainer 79 and a second retainer 84 which is adjustably secured to a fixed support plate 85. Electrical contacts 86 and 87 are secured to respective retainers 78 and 79 to move therewith. Contact 86 engages a stationary contact 88 when bellows 76 is collapsed by a predetermined amount, and contact 87 engages a stationary contact 89 when bellows 77 is expanded by a predetermined amount. The contacts associated with bellows 76 are thus closed when the input pressure falls below a first preselected limit. The contacts associated with bellows 77 are closed when the input pressure exceeds a second predetermined limit.

Motor 59 can advantageously be a reversible, two-phase induction motor having first and second windings 92 and 93. First terminals of windings 92 and 93 are connected to the first terminal of alternating current source 94. The second terminal of current source 94 is connected to contacts 88 and 89. Contact 86 is connected directly to the second terminal of motor winding 93, and contact 87 is connected directly to the second terminal of motor winding 92. A capacitor 95 is connected between the second terminals of motor windings 92 and 93. Terminals 88 and 89 are connected to respective switch arms 96 and 97 which are actuated by respective clutches 71 and 70. Switch arms 96 and 97 are adapted to engage respective contacts 98 and 99 which are connected to respective contacts 86 and 87.

As long as the input pressure transmitted by conduit 75 remains within preselected limits, the apparatus of FIGURES 2 and 3 remains in the position shown with motor 59 being deenergized. If the input pressure exceeds the upper set point due to excessive flow of external reflux through conduit 16, bellows 77 expands until contacts 87 and 89 engage one another. This energizes motor 59 for rotation in a first direction. Clutch 70 is actuated so as to move switch arm 97 into engagement with contact 99 immediately after motor rotation is started. This assures that the motor will remain energized for one cycle of rotation of shaft 58, even though the pressure within bellows 77 may decrease during this cycle. Motor 59 is geared to shaft 58 so as to rotate the shaft in a period of time such as one minute, for example. However, this time obviously can be varied for different applications. During the cycle of rotation, shafts 63 and 56 are rotated when disk 61 engages wheel 62 so as to change the tension on spring 54 and thus adjust the output pressure of the pneumatic transmitter 50. This change in output pressure from transmitter 50 adjusts the set point of controller 47 in FIGURE 1 to reduce the flow through conduit 16. This change takes place in a very short time to reduce the output signal of differential pressure transmitter 25. Accordingly, the pressure in conduit 75 normally will decrease sufficiently by the end of one cycle of motor rotation to move contacts 87 and 88 out of engagement with one another. Rotation of motor 59 is thus terminated when clutch 70 is returned to the position shown in FIGURE 3.

A decrease in pressure in conduit 75 below the lower set point permits bellows 76 to contract until contacts 88 and 86 are in engagement. This energizes motor 59 for rotation in the opposite direction because capacitor 95 is connected in series with winding 92 to change the relative phases of the currents through the two motor windings. Clutch 71 is energized to assure one cycle of motor operation in a manner similar to that previously described with respect to clutch 70. Under normal operation, rotation of motor 59 is again terminated after one cycle.

With reference to FIGURE 1, it can be seen that the output signal of reset mechanism 43 thus changes the set point of flow controller 47 stepwise until an internal reflux value is established which can be maintained within the column. In the event this resetting is not sufficient in one cycle to establish a stable value, the operation continues as many times as are required to obtain a stable value of reflux liquid flow in the column which can be maintained by manipulation of the external reflux flow. A constant internal reflux flow provides smooth column operation. The amount the set point is varied during each cycle of operation is determined by the adjustable variables of the mechanism of FIGURE 2. For example, the force exerted by spring 54 can be adjusted by regulating the position of screw 55 in plate 53. Similarly, the degree of rotation of shaft 56 is a function of the position of wheel 62 with respect to the opening in disk 61. The set points can be adjusted by varying the forces exerted on bellows 76 and 77 by respective springs 80 and 83.

A modified form of the apparatus of FIGURE 2 is illustrated schematically in FIGURE 4. The drive shaft 58' carries a plurality of cams 100, 101 and 102 which are adjustable on shaft 58' with respect to one another. These cams engage a sleeve 103 which is mounted on shaft 63'. When the same are in the position illustrated, shaft 63' is rotated approximately 45° for each rotation of shaft 58'. This rotation can be increased by spreading the cams with respect to one another so that at least one of the cams engages sleeve 103 during a greater portion of each cycle of rotation of shaft 58'.

While this invention has been described in conjunction with the control of internal reflux in a fractionation column, it should be evident that it is not limited to such an application. The invention has generally utility wherever it is desirable to change the set point of a controller responsive to a signal exceeding preselected limits. This permits a process control system to become stablized at a point which can be maintained, and thereby assure smooth operation.

While the invention has been described in conjunction with present preferred embodiments, it should be evident that it is not limited thereto.

What is claimed is:

1. Control apparatus comprising a signal transmitter having an adjustable set point, a reversible motor having a drive shaft, means connecting said drive shaft to said set point to adjust same, a first pressure responsive switch which is actuated when the pressure applied thereto exceeds a first preselected value, a second pressure responsive switch which is actuated when the pressure applied thereto becomes less than a second preselected value which is less than said first preselected value, means to apply a common pressure to said first and second switches, means responsive to said first switch being actuated to energize said motor for rotation in a first direction, and means responsive to said second switch being actuated to energize said motor for rotation in a second direction.

2. The apparatus of claim 1, further comprising first and second rotatable cams, first clutch means connected between said shaft and said first cam to rotate same when said shaft rotates in said first direction, second clutch means connected between said shaft and said second cam to rotate same when said shaft rotates in said second direction, third and fourth switches positioned so as to be actuated by rotation of said first and second cams, respectively, said cams being of such configuration that said third and fourth switches remain actuated by the respective cams during substantially a complete revolution of said shaft, and means connecting said third and fourth switches in parallel with said first and second switches, respectively.

3. The apparatus of claim 1 wherein said means connecting said drive shaft to said set point comprises a second shaft, means connecting said second shaft to said set point so that rotation of said second shaft adjusts said set points, a rotatable wheel, means connecting said wheel to said second shaft so that rotation of said wheel rotates said second second shaft, and a disk secured to said drive shaft to rotate therewith, said disk being mounted at right angles to said wheel and in engagement therewith, said disk having a radial slot therein.

4. The apparatus of claim 1 wherein said means connecting said drive shaft to said set point comprises a second shaft, means connecting said second shaft to said set point so that rotation of said second shaft adjusts said set point, a sleeve mounted on said second shaft, and a cam secured to said drive shaft to rotate therewith, said cam being mounted on said drive shaft so as to engage said sleeve during a part of each revolution of said drive shafe to rotate said second shaft.

5. Control apparatus comprising a signal transmitter having an adjustable set point, a reversible motor having a drive shaft, means connecting said drive shaft to said set point to adjust same, first switching means which is actuated when an input signal exceeds a first preselected value, second switching means which is actuated when an input signal becomes less than a second preselected value, means to apply a common input signal to said first and second switching means, means responsive to said first switching means being actuated to energize said motor for rotation in a first direction, and means responsive to said second switching means being actuated to energize said motor for rotation in a second direction.

6. The apparatus of claim 5 wherein said motor is a two phase induction motor having first and second windings, and wherein said means responsive to said switching means comprises a capacitor, a source of alternating current, means responsive to said first switching means being actuated to connect said source across said first winding and across said second winding and said capacitor in series, and means responsive to said second switching means being actuated to connect said source across said second winding and across said first winding and said capacitor in series.

No references cited.